United States Patent [19]
Stillings

[11] Patent Number: 5,979,477
[45] Date of Patent: Nov. 9, 1999

[54] HIGH PURITY, NON-CONTAMINATING, BURST DISK

[75] Inventor: Matthew J. Stillings, Sandy, Utah

[73] Assignee: Trebor International, Inc., West Jordan, Utah

[21] Appl. No.: 09/018,415

[22] Filed: Feb. 4, 1998

[51] Int. Cl.[6] .................................................. F16K 17/14
[52] U.S. Cl. ......................... 137/1; 137/68.28; 137/910; 137/68.23
[58] Field of Search ................ 137/910, 68.19, 137/68.23, 68.28, 1

[56] References Cited

U.S. PATENT DOCUMENTS

| | | | |
|---|---|---|---|
| 443,873 | 12/1890 | Snow | 137/68.23 X |
| 2,824,164 | 2/1958 | Bauman | 136/90 |
| 2,947,443 | 8/1960 | Sawyer et al. | 220/89 |
| 3,044,479 | 7/1962 | Meyer et al. | 137/68 |
| 3,670,925 | 6/1972 | Moyant | 222/3 |
| 3,731,948 | 5/1973 | Risko | 137/68.19 X |
| 3,854,522 | 12/1974 | Didycz et al. | 165/1 |
| 3,977,428 | 8/1976 | Schilling | 137/340 |
| 4,207,913 | 6/1980 | Fike, Jr. | 137/68 R |
| 4,298,037 | 11/1981 | Schumacher et al. | 141/1 |
| 4,842,004 | 6/1989 | Steinman | 137/68.19 |
| 5,012,945 | 5/1991 | Keenan | 137/910 X |
| 5,205,834 | 4/1993 | Moorehead et al. | 137/845 X |
| 5,279,321 | 1/1994 | Krimm | 137/68.1 |

OTHER PUBLICATIONS

"Pressure Relief Devices," The American Society of Mechanical Engineers, United Engineering Center, Jan. 1995, pp. 1–9, 11–13, 15–63 and 65–77.

Advertising Materials for "Rupture Disc, Graphite Series—Data Sheet 3051", manufactured by Fike Metal Products, 704 South 10th Street, Blue Spring, MO 64015, Sep. 1992, pp. 1–4.

Product Literature for "ASME Code/Rupture Discs", manufactured by Fike Metal Products, 704 South 10th Street, Blue Spring, MO 64015, pp. 13–17.

"Permeability and Internal Pressure Determination—Form 7700", GE Fused Quartz Products, May 1990, p. 15.

"Electrical Equipment For Laboratory Use", UL 3101–1, Oct. 6, 1993, pp. 11, 12, and 19.

Primary Examiner—Denise L. Ferensic
Assistant Examiner—Ramyar Farid
Attorney, Agent, or Firm—Madson & Metcalf

[57] ABSTRACT

A burst disk assembly relies on a brittle material as the burst disk. Conventional manufacturing tolerances are suitable with the mounting assembly. Flatness and collinearly are achieved by an alignment adapter interfacing between an anvil and the burst disk, on the low-pressure side thereof. A seal, typically thinner than the alignment adapter, is held against the high-pressure side face of the burst disk by a pilot or loader face. All materials are ultra-pure, high-temperature tolerant, and non-reactive. Thin films over metal are not used. Reliable, repeatable, predicable burst pressures have been achieved without resort to highly specialized manufacturing processes. Ceramics and crystalline materials may serve as a burst disk, and quartz has been shown effective. Various grades of fluorocarbon materials have been found to provide suitable coatings, fixtures, and seals. Expanded polytetrafluoroethylene forms a suitable seal. Slightly expanded PTFE such as that sold under the brand-name "Gylon™" has provided suitable alignment adapters.

18 Claims, 8 Drawing Sheets

HIGH PURITY, NON-CONTAMINATING, BURST DISK

BACKGROUND

1. The Field of the Invention

This invention relates to pressure relief mechanisms for operation in ultra-pure environments and, more particularly, to novel systems and methods for providing burst disks in metal-free, ultra-pure, environments subjected to liquids at elevated temperatures, with respect to ambient.

2. Background Art

Pressure relief is a critical function in systems managing, transporting, or relying upon fluids. Fluids include gases and liquids. Many industrial processes rely on hot liquids, heated to temperatures that may damage, weaken, leach, or otherwise interact with metals, polymers, and other common materials.

One industry that has suffered with the limited technology of pressure relief devices is the semiconductor processing industry. For example, hot, de-ionized water is used in numerous processes. Impurities are measured in parts per billion. Some materials may be hot acids used in etching and cleaning processes. Transportation, holding, heating, and other procedures for managing ultra-pure water, acids, and the like, are problematic in several ways.

For example, burst disks have traditionally been made of metal. Regardless of the "stainlessness" of a metal, the purity requirements are not met by any known metals. Polymers may similarly leach, react, degrade, or otherwise contaminate liquids. Moreover, polymers are typically not dimensionally stable. Polymers creep, stretch, yield, and otherwise become unreliable. As burst materials, polymers (plastics, elastomers) respond to load, pressure, time, and chemical environment, destroying any hope of reliability and repeatability.

Polymer-coated metals have been proposed. No apparatus is perfect. Pinholes may be created by creep or yielding of polymers. Pinholes may be formed during manufacturing. Thin layers do not achieve perfect coverage. Detection of flaws ranges from extremely difficult to impossible. Failures can be catastrophic.

Contaminants exceeding allowable limits may destroy a batch of a product. Physical destruction is not required. Rendering a wafer unusable due to contaminant reactions with a surface can waste product output.

What is needed is a pressure relief mechanism that is absolutely clean before and after release. All materials that may potentially contact contained fluids, even in the event of failures, should be pure and non-reactive. Materials should tolerate elevated temperatures in the range of 100 degrees Fahrenheit to 200 degrees Fahrenheit. In some acids, temperatures may range from 100 degrees Celsius to 200 degrees Celsius. These temperatures represent pressurized systems operating above the ambient boiling temperature of water. Saturation pressures are commensurate with the thermodynamics of the contained fluid.

Thus, stability over a broad range of temperatures, reliability in service, long life under exposure to extreme of temperatures, pressure, and reactive agents, and the like must all be tolerated. Repeatability of designs, and reliable repeatability over the life time of an installed pressure-relief apparatus are very desirable. Currently, complex valve mechanisms are the most reliable devices used. Polymeric burst disks are not repeatable in service. Metals are reactive. Polymer-coated metals still fail to maintain purity reliably.

What is needed is a reliable burst disk mounted in a fixture that maintains purity, providing dimensional stability and long term repeatability at elevated temperatures, pressures, and reactivities.

BRIEF SUMMARY AND OBJECTS OF THE INVENTION

In view of the foregoing, it is a primary object of the present invention to provide a clean high temperature, non-reactive, repeatable, producible, reproducible, low-cost, dimensionally stable, burst disk and mounting system.

It is an object of the invention to provide a burst disk formed of a crystalline material, such as quartz, mounted in a fixture that will tolerate conventional manufacturing processes while providing suitable reliability and low-cost fixturing for routine installations.

It is an object of the invention to provide a polymeric mounting system that will adapt to the breadth of manufacturing tolerances resulting from ceramic and crystalline materials during the manufacturing processes.

It is an object of the invention to provide a low-cost, burst disk and mounting system, susceptible to design by engineers for a desired, realistic, pressure, providing support up to an appropriate limit, and reliable failure (operation) above a desired limit, within tolerance levels desired to be maintained in a fluid-handling system.

It is an object of the invention to provide a burst disk assembly that can be easily and repeatably assembled and disassembled within a few minutes, without complex tools or instrumentation.

It is an object of the invention to provide a burst disk construction that can rely on readily available materials at standard manufacturing tolerances, in order to maintain costs while providing repeatability and reliability.

It is an object of the invention to provide reliable sealing between a burst disk, a mounting assembly, and a fluid handling system.

Consistent with the foregoing objects, and in accordance with the invention as embodied and broadly described herein, an apparatus and method are disclosed, in suitable detail to enable one of ordinary skill in the art to make and use the invention. In certain embodiments, an apparatus and method in accordance with the present invention may include a body or receiver for holding a burst disk with an associated alignment adapter and seal. A head or keeper may be provided, connectable to the body or receiver to hold the burst disk, seal, and alignment adapter securely.

A burst disk may be sandwiched between a seal and an alignment adapter to form a standardized stack. The stack may be designed for a suitable pressure and temperature by a combination of thickness and diameter, along with the materials selection for the burst disk. In one embodiment, the burst disk may be formed of quartz manufactured to a thickness, and cut to a diameter suitable for the desired pressure range.

The stack may be held between the face of an anvil and a loader or pilot. Typically, an alignment adapter may fit on the low pressure side of the burst disk, interfacing with the anvil. The seal may be positioned between the face of the loader and the high pressure face of the burst disk.

The pressure relief assembly, or burst disk assembly, may be assembled with threads. A union-type connector may hold the body (receiver) and the head (keeper) together. In certain embodiments where position is not critical, and thus registration of the head and body are not required or desirable, the anvil and loader may be formed in an adapted fitting to rotate with respect to one another, mutually engaged by mating threads.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 8, is not intended to limit the scope of the invention. The scope of the invention is as broad as claimed herein. The illustrations are merely representative of certain, presently preferred embodiments of the invention. Those presently preferred embodiments of the invention will be best understood by reference to the drawings, wherein like parts are designated by like numerals throughout.

Those of ordinary skill in the art will, of course, appreciate that various modifications to the details of the Figures may easily be made without departing from the essential characteristics of the invention. Thus, the following description of the Figures is intended only as an example, and simply illustrates one presently preferred embodiment that is consistent with the invention as claimed.

Figure 1:
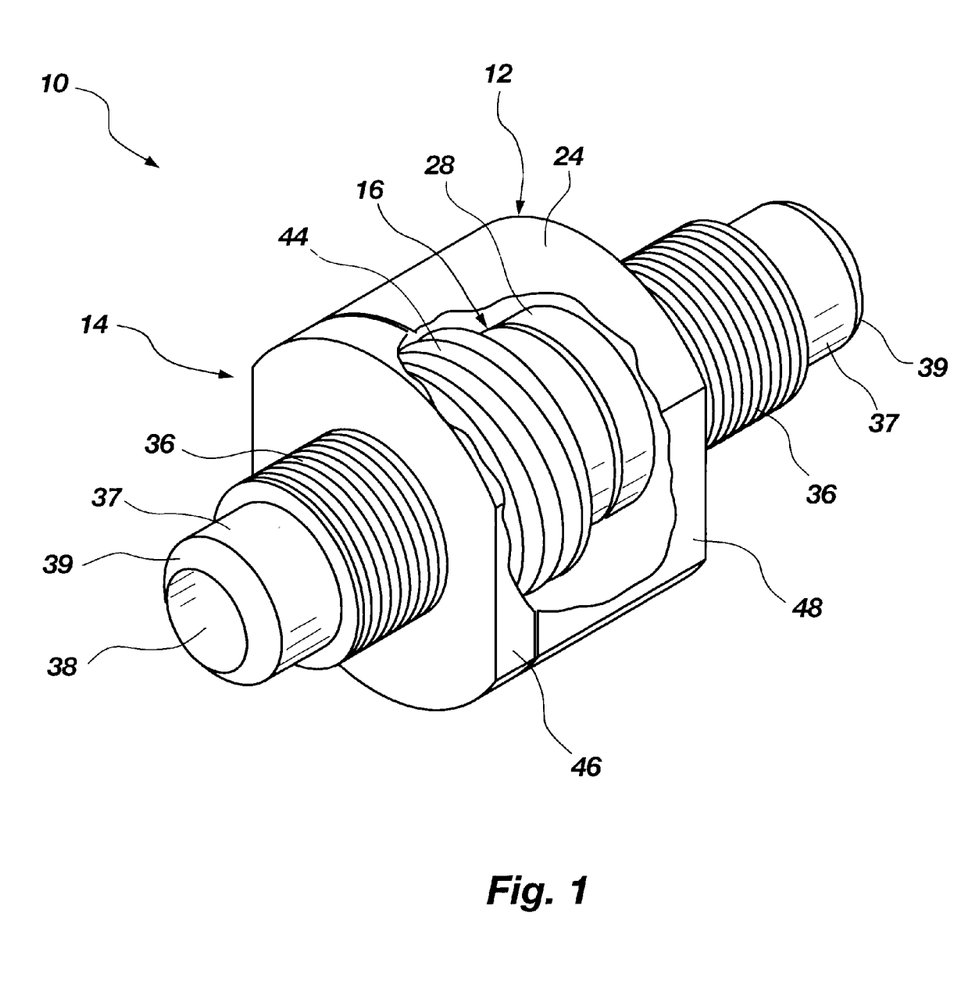
FIG. 1 is a partially cutaway, perspective view of an apparatus in accordance with the invention.
Figure 2:
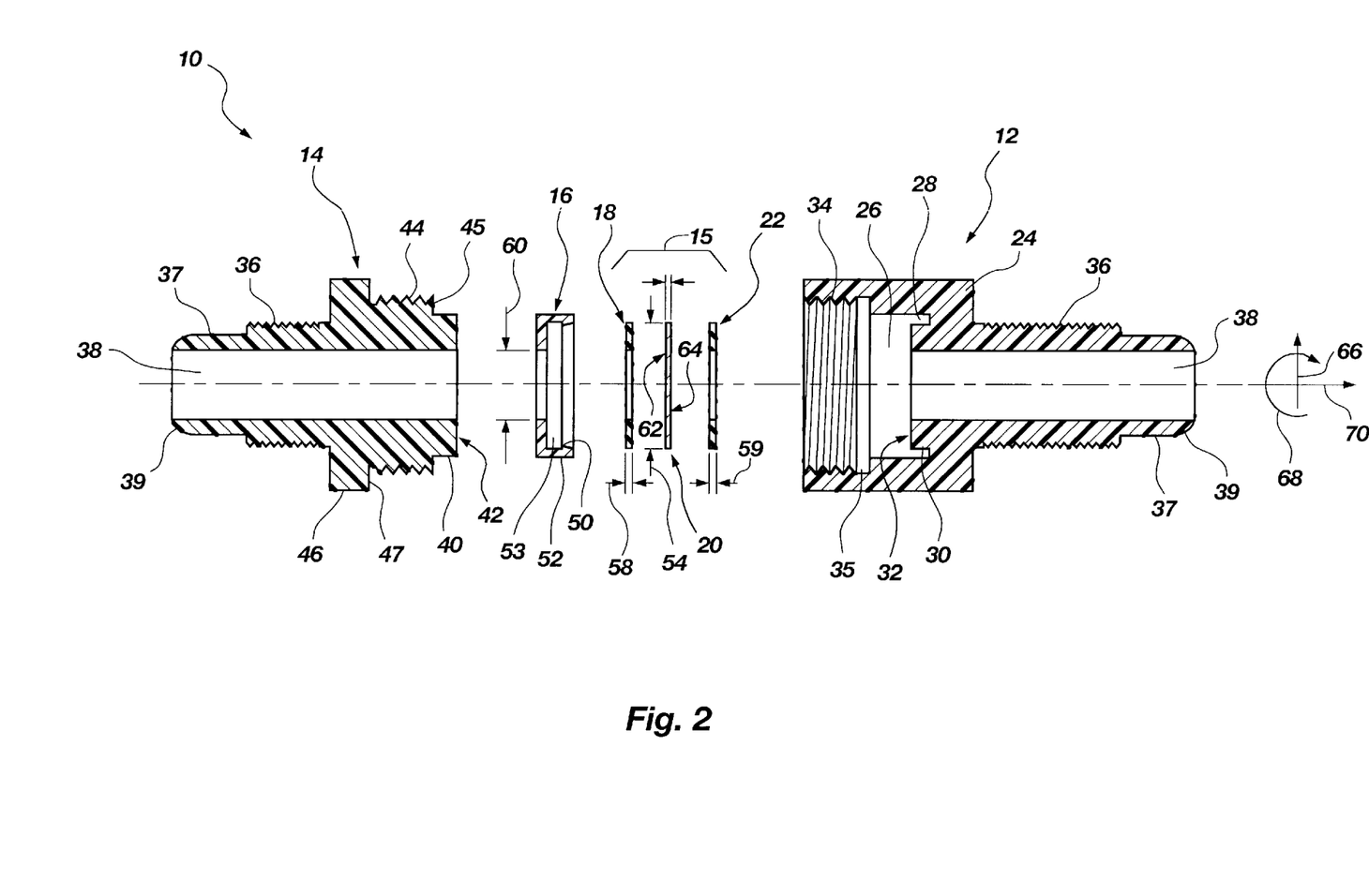
FIG. 2 is a exploded, elevation view of the apparatus of FIG. 1.

Referring to FIG. 1–2, a pressure relief apparatus 10 may be formed as a burst disk assembly 10. A body 12 (receiver 12) may be formed of a suitable material resistant to chemical reactions, distortion at elevated temperatures, and creep or fracture at elevated pressures. In certain presently preferred embodiments, the body may be formed of a fluorocarbon polymer. Various fluorocarbons appear to serve well, and polyteterafluoroethylene (PTFE) has been used to make suitable parts.

A head 14 (keeper 14) may be adapted to engage the body 12 to capture a stack 15. The stack 15 may be provided with a retainer 16. The retainer 16 may permit assembly of the stack 15, and insertion in the body 12, with a minimum of difficulty in aligning small parts.

The stack 15 may include a seal 18. The seal 18 may be formed as a small disk. In one alternative embodiment, the seal 18 may comprise a perforate disk, in appearance like a washer. The seal 18 may be fitted against a burst disk 20.

The burst disk 20 is preferably formed of a material having a high strength and a comparatively high stiffness. Brittle materials have been found suitable for the burst disk assembly 10.

In one embodiment, a crystalline material or a ceramic material may form the burst disk 20. For example, quartz sheet has been found suitable for forming burst disks 20. the burst disks may be cut directly from the sheet using diamond saws. Post-cutting processing is not required. Nevertheless, flame edging of burst disks 20 is permissible in certain embodiments. Flame rolling or flame melting of cut edges tends to remove stress concentrations caused by fine chips or cracks associated with cutting processes. Nevertheless, burst disks 20 have been formed directly from crystalline sheet stock simply cut to size.

Alignment (e.g. a boundary condition of the body 12 and head 14 can be important. An alternative to maintaining excessively high tolerances is to provide an alignment adapter 22. The alignment adapter can be formed to be thicker, and even of a different material, if desired, than the seal 18. Thus, the seal 18 may form a compliant fit against the burst disk 20. However, the alignment of the head 14, seal 18, and burst disk 20, leave a colinearity and flatness tolerance on the down-stream or low-pressure face of the burst disk 20.

A comparative thicker alignment adapter 22 may be designed to accommodate variations in flatness and colinearity arising from the combination of the burst disk on the seal on the head 14. Thus, the alignment adapter 22 provides an alignment between the body 12 and the burst disk 20. The alignment adapter 22 may provide a second seal. Nevertheless, the seal 18 may provide all necessary sealing in certain embodiments.

In one embodiment, burst disk assemblies 10 may be vented to a containment vessel (not shown). Accordingly, the alignment adapter 22 may be formed to provide sealing between the burst disk 20 and the body 10, thus containing any fluids discharged upon operation of the burst disk 20.

In one embodiment, the body 12 may be provided with a chamber wall 24 enclosing a chamber 26 adapted to receive the stack 15. The chamber 26 may be formed to provide a recess 28 surrounding an anvil 30. Thus, the face 32 of the anvil 30 is relieved by the recess 28 to fit, at least partially, within the retainer 16. The anvil 30, and more particularly the face 32 thereof, is sized and adapted to support the alignment adapter 22 against which the burst disk 20 fits. The chamber 26, and specifically the wall 24 may be provided with a thread 34 or a threaded portion 34. In general, a fastener 34 may be provided for securing the head 14 with respect to the body 12. In the embodiment illustrated in FIGS. 1–2 the threaded portion 34 secures the head 14 with respect to the chamber wall 24.

A relief 35 may be provided within appropriate manufacturing tolerances, in order to transition between the threaded portion 34 and the remaining, non-threaded portion of the wall 24 surrounding the chamber 26 or cavity 26 capturing the stack 15.

As a practical matter, both the body 12 and the head 14 may be formed in accordance with certain, standardized, plumbing-fitting, protocols. For example, the body 12 and head 14 may each be integrally formed with a respective conduit 36 or conduit wall. The conduit walls 36 may be separate fittings, but elimination of crevices that may hold contaminants is a high priority in ultra-pure, fluid-handling systems.

Accordingly, in one presently preferred embodiment, the conduit 36 or conduit wall 36 with its associated threads 37 or threaded portion 37 may be integrally molded or otherwise fabricated. Various brands of fittings are known in the art. For example, national pipe thread fittings (NPT) are well established, but are typically less desirable because they leave crevices for collecting contaminants. Swagelock-brand fittings have a certain compression mechanism that has achieved some popularity on conventional plumbing systems.

However, in one presently preferred embodiment, Flaretek™-brand fittings provide a sealing surface 39 in combination with threads 37 for coupling conduits 36. The sealing surfaces 39 are engaged with mating surfaces (not shown) to provide reliable seals, minimum obstructions to flow, minimum pressure loss, and reduced opportunity for capture of contaminants in intervening crevices. Thus, the flow passage 38, although only used on one side of the stack 15, may remain unobstructed. As a practical matter, contaminant capture is often the predominant concern in maintaining a flow passage 38 of constant size and minimum occurrence of joints.

A loader 40 or pilot 40 may be formed as part of the head 14. In one embodiment the face 42 of the pilot 40 is designed to be substantially parallel to the face 32 of the anvil 30. However, manufacturing tolerances result in the reality of non-parallel faces 32, 42, and non-coaxial or non-collinear body 12 and head 14, with respect to the anvil 30 and pilot 40.

Thus, the thread portion 44 of the head 14, and the shoulder 45 thereof, will typically be manufactured to suitable tolerances. Tolerances may be very precise. However, in one embodiment of an apparatus in accordance with the invention, tolerances may be relaxed to conventional, standardized tolerances for plumbing fittings. Such tolerances may be permissible due to the presence of the alignment adapter 22. The alignment adapter 22 may creep to accommodate the lack of parallelism and colinearity of the pilot 40 and anvil 30. The retainer 16 and seal 18 may be designed to contribute to an essentially "floating" burst disk 18.

The shoulder face 45 may be designed to bottom out against the body 12 of the apparatus 10. However, the shoulder 45 or shoulder face 45, in one embodiment, may be permitted to require only a nominal fit. Tolerances may preclude actual contact of the shoulder face 45, in favor of the face 42 of the loader. That is, the shoulder face 45 may be designed to make contact with the body 12 in order to preclude breakage of the stack 15, and particularly the burst disk 20. Nevertheless, contact between the loader 40, the seal 18, burst disk 20, and alignment adapter 22, and the anvil 30 should accommodate creep. Thus, the shoulder face 45 may be formed to have a tolerance assuring that it cannot be a member of the critical, limiting, contact path in the stackup between the body 12 and the head 14.

The stop 46, or shoulder 45 also has a face 47. As with the shoulder face 45, the face 47 of the stop 46 (shoulder 46) can be a contact- or stackup-limiting element. However, in one embodiment, the critical path for contact exists between, and to include surfaces of, the pilot 40, or loader 40, the stack 15, and the anvil 30.

Flats 48 may be formed on the body 12 and head 14. Flats 48 may be simple, diametrically opposed faces or surfaces 48. In certain embodiments, the flats 48 may be hexagonal as conventionally provided in bolts, nuts, plumbing fittings, and the like. In one embodiment, the flats 48 may be registered between the body 12 and the head 14 to assure a specific positioning therebetween.

The retainer 16 may perform several functions. In assembling the stack 15, handling and capture may be considerations. Also, verification of alignment without distortion, or misplacement may be more easily accomplished and verified outside of the body 12. Accordingly, the retainer 16 may be provided. The retainer 16 may include a detent 50 protruding a suitable distance from the wall 52 or curb 52 of the retainer 16. The base 51 may be optional. The base 51 may provide an element within the contact path between the loader 40 and anvil 30. In other embodiments, detents 50 on each end of the retainer 16 may capture the stack 15 therebetween. Thus, the retainer 16 may be inside or outside the contact path, as desired. Meanwhile, detents 50 protruding from the wall 52 of the retainer 16 may secure the stack 15 as an assembly easily positioned in the chamber 26 against the anvil 30.

A diameter 54 of the burst disk 20 and a thickness 56 thereof may be designed to provide a selected burst pressure. A burst disk 20 may be designed to provide a specific maximum operational limit at which bursting will occur. Meanwhile, a range and probability of sustained pressures at which burst will not occur may be desirable. Accordingly, increased thickness 56 provides an increase in bending stresses at an outermost fiber in accordance with the theory of structural mechanics. Likewise, the diameter 54 may be selected to provide the appropriate maximum moment in conjunction with a maximum stress along a face of the burst disk 20. In certain embodiments, a comparatively large diameter may assure reduction of the influence of edge effects. Thus, less care may be required in the precision of cutting the diameter 54 of a burst disk 20 from a sheet of pre-fabricated, crystalline material.

Very high pressures may be supported by relatively thin thicknesses 56, so long as the corresponding diameter 54 of a burst disk 20 is sufficiently small. Thus, a wide variety of sizes may be designed for burst disks 20 in a single apparatus 10. Moreover, a design of the apparatus 10 may accommodate any suitable envelope, by suitable calibration of proper diameters 54 and thicknesses 56 for a brittle, burst disk material suitable for the environment in question.

The thickness 58 of the seal 18 may be selected to provide floatation of the burst disk 20. Nevertheless, two principal fruitions of the seal 18 are to accommodate surface variations in the flatness or curvature of the burst disk 20, and effective sealing. These need not be separate considerations, but may be. Flatness may effect breakage of the burst disk 20 during assembly. Accordingly, a seal 18, may be designed to accommodate the tolerance selected for flatness and colinearity between the pilot (loader) 40 and burst disk 20 in combination with the anvil 30. However, the principal function of the seal 18 is to seal the flow passage 38 against the escape of fluid between the burst disk 20 and the head 14. Thus, expanded fluorocarbons, such as polytetrafluoroethylene may provide suitable sealing, even at thicknesses below 0.040 inches. The seal 18, in one embodiment, may be designed and fabricated in accordance with the apparatus and methods of the U.S. patent application Ser. No. 08/961, 954 filed Oct. 31, 1997, directed to an ultra-pure, non-reactive, elevated-temperature seal assembly, and incorporated herein by reference.

By contrast, the thickness 59 of the alignment adapter 22 may preferably be designed to be substantially greater than the thickness 58. The thickness 59 may be designed for accommodating manufacturing and assembly tolerances in flatness and colinearity between the burst disk 20 and the anvil 30. Accordingly, any lack of colinearity between the face 42 of the loader 40 and the face 32 of the anvil 30 may be accommodated by the alignment adapter 22. The position of the burst disk 20 cannot be over specified. Otherwise, the burst disk 20 may be fractured during assembly or service due to residual stress imposed by the anvil 30 and loader 40. Accordingly, the thickness 59 is designed in combination with the tolerances provided for the alignment of the body 12 and head 14 as they mutually contact the stack 15 between the anvil 30 and loader 40. Providing comparatively large tolerances of substantially the same values as conventional plumbing apparatus may be acceptable in certain embodiments of an apparatus 10 in accordance with the invention. By proper selection of the thickness 59, and proper selection of a material from which to fabricate the alignment adapter 22, great reductions in cost have been possible. The thickness 59 is preferably greater than 0.040 inches. One presently preferred material is an expanded polytetrafluoroethylene sold under the brand name of "Gylon". The material for the seal 18 may be a highly expanded fluorocarbon, sold under the trademark of "Teflon™" or the trademark "Gore-Tex™".

The inner diameters 60 of the seal 18 and alignment adapter 22 may be identical to those for those the flow passages 38. The "Poisson effect" may be accommodated by providing a slightly greater diameter 60. As a practical matter, in one embodiment, the alignment adapter 22 may be fabricated without any penetrations, and without a need for an inner diameter 60. However, due to increased thickness 59 and strength of the alignment adapter 22, as compared to certain seals 18, a penetration defined by the inner diameter 60 may provide for reliable disk pressures for operation on the burst disk 20. For example, the alignment adapter 22, if not perforated may provide additional support to the burst disk 20 before or after rupture, thus jeopardizing the integrity of a system protected by a burst disk assembly 10.

The high pressure face 62 of the burst disk 20 is subjected to the pressurized environment to be protected by the burst disk 20. The low pressure face 64 may be exposed to ambient pressures, or the like. The high pressure face 62 is typically subjected to compression while the low pressure face 64 is subjected to tension. Accordingly, failure will occur on the low pressure face 64 of the burst disk 20. The fracture mechanics of the low pressure face 64 have been studied. Nevertheless, additional design data may be used for selecting a suitable material for the burst disk 20, and for assuring reliable, repeatable service.

Additional developments in the theory of fracture mechanics in recent decades have provided information concerning micro cracks in materials. Accordingly, the general rubric of "fatigue" and "stress corrosion cracking" are much better understood today. Accordingly, a material should be selected for the burst disk 20 that will provide longevity suitable for the application. For example, glass may be used as a burst disk 20 in certain environments. However, acid environments tend to etch glass. Structurally neutral coatings may be added for protection. Uniform etching may improve the stress level of glass under deflection and either weaken it or exceed its design pressure limit.

Similarly, other environments tend to create mircocracks in glass, increasing stress concentrations and promoting reduction of the maximum stress limit at which the glass will fracture. Thus, the fluid contained within the flow passages 38, particularly on the low pressure face 64, may be critical to the proper design of the burst disk 20. In one presently preferred embodiment, quartz has been found suitable, repeatable, predictable, and reliable in service. Crystalline materials, such as quartz appear to provide stable, non-reactive, high-strength materials that can be relied upon.

A radial direction 66, circumferential direction, and axial direction 70 may be defined with respect to the flow path 38 or burst disk 20 in the stack 15. Pressures in the flow passage 38 may effect stresses in all three directions 66,68,70. As a practical matter, the use of creeping materials, such as fluorocarbons, is desirable for the seal 18 for several reasons.

Fluorocarbons are chemically stable, very non-reactive. Also, the "Poisson effect" on the seal 18, in the presence of elevated temperatures, may improve the reliability of the seal 18. Thus, the seal 18 can hold the fluids desired, even in the presence of creep. Thus, an ultra-pure environment may be maintained. The pressure load (a boundary condition) will act radially 66. Stress in the body 12 and the head 14 will be circumferential 68 (a boundary condition). This comports with hoop stress theory. Stress in an axial direction 70 will abide by mechanical theories understood in the art.

Nevertheless, creep in an axial direction 70 may be a critical factor to be accommodated. For example, heat soaking and re-tightening may be used after assembly of the apparatus 10. Thus, initial creep may be accelerated by elevated temperatures designed to transition through the substantial majority of creep available in the seal 18, alignment adapter 22 and retainer 16. The heat soaking may also accommodate creep in the anvil 30 and loader 40.

Figure 3:
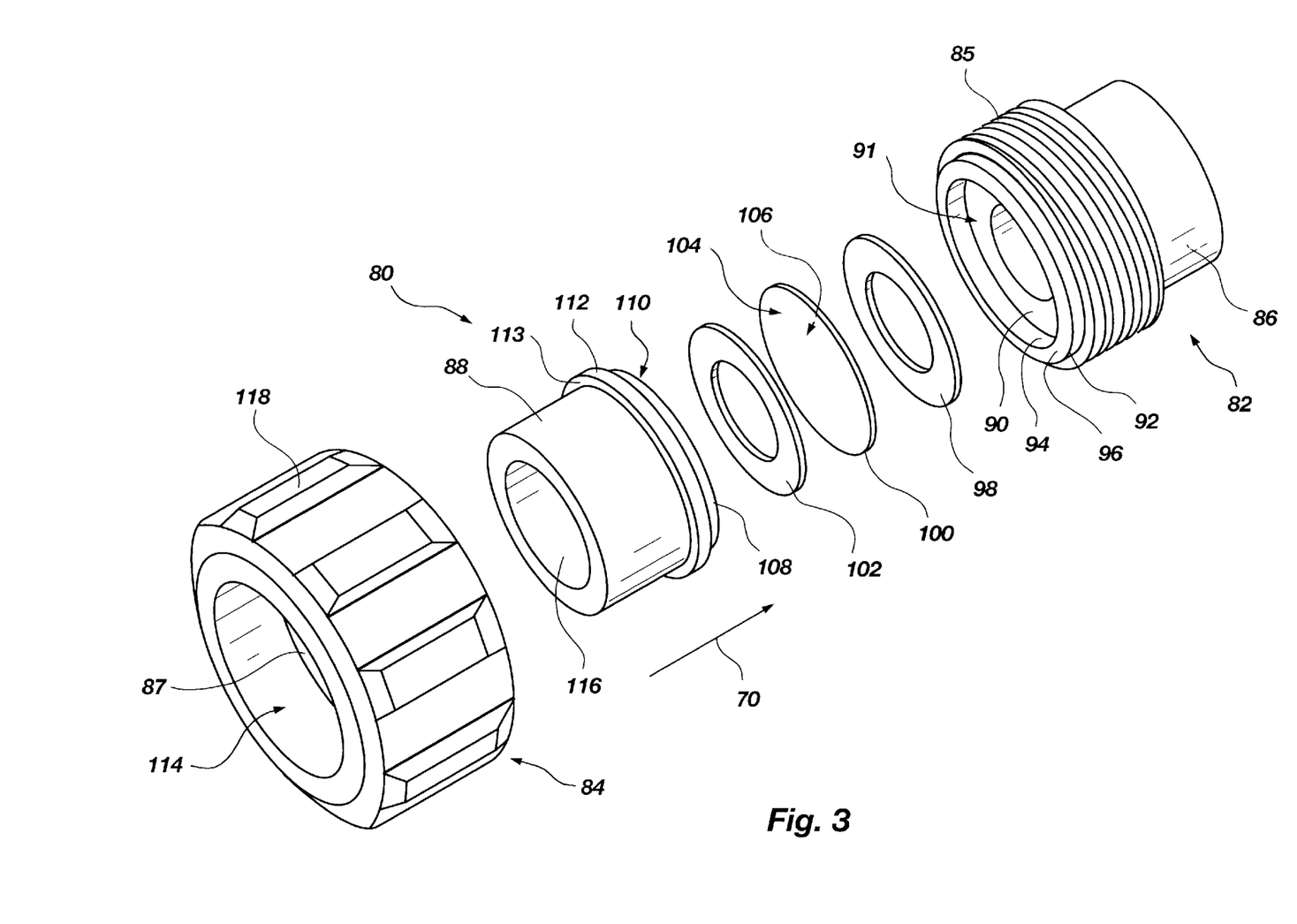
FIG. 3 is an exploded, perspective view of an alternative embodiment of the intention.
Figure 4:
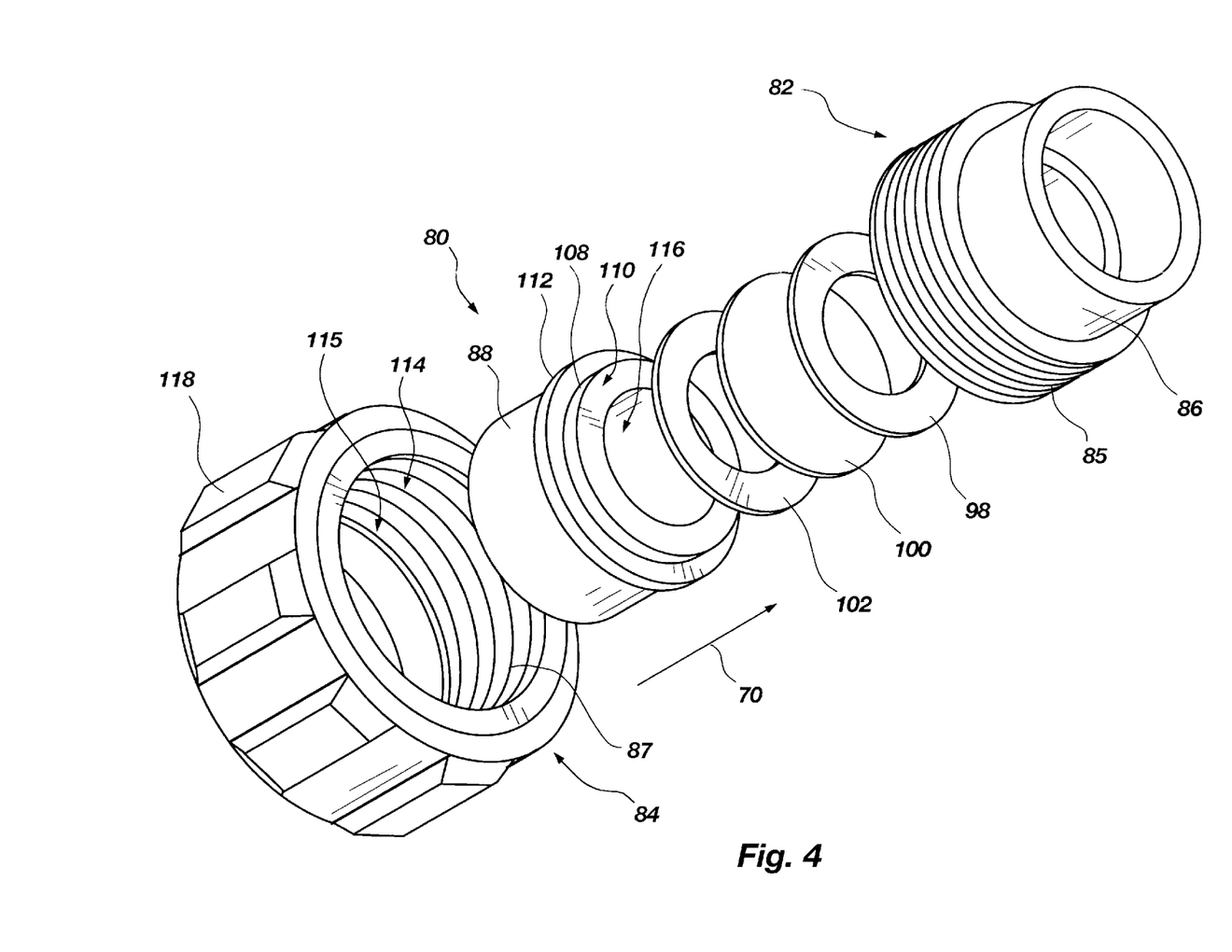
FIG. 4 is an exploded, perspective view of the apparatus of FIG. 3, from a different viewpoint.

Referring to FIGS. 3–4, a union-style body 82 and head 84 apparatus may be fabricated as a pressure relief apparatus 10. A body 82 may be provided with a keeper 84. Note that the mating relationship may be reversed from that of the body 12 and head 14 of the apparatus 10 of FIGS. 1–2. Nevertheless, either relationship for male and female parts may be used with respect the to anvil 30 and loader 40. Threads 85 may be provided to couple the body 82 with the head 84. The orientation, with respect to pressure, of the body 82 and the head 84 corresponds to that of the body 12 and head 14.

The threads 85 may be integral with the conduit wall 86 of the body 82. By contrast, the threads 87 of the head 84 are discontinuous, and distinct from, the conduit wall 88.

The anvil 90 in the body 12 may or may not contain the recess 28 of FIGS. 1–2 as illustrated in Figures in 3–4, the recess 28 is absent from the anvil 90. The anvil 90 is contained within a cavity 91. A curb 92 in the body 82 surrounds the cavity 91. The curb 92 may provide for assembly and alignment of the stack 15 in the cavity 91.

The curb wall 94 may be designed to pilot the body 82 into the head 84. Alternatively, the curb wall 94 may be designed to be relieved in a radial direction 66 to eliminate the influence of the threads 85 or head 84 on the precision or contact of the face 96 thereof.

For example, the face 96 of the curb 92 need not make contact with another component. The alignment adapter 98, burst disk 100, and seal 102 correspond to the alignment adapter 22, burst disk 20 and seal 18, respectively. Accordingly, the anvil 90 contacts the alignment adapter 98 responsible for floating the burst disk 100 to accommodate any lack of flatness and colinearity between the body 82 and head 84.

The seal 102 against the high pressure face 104 (or a coating thereon) of the burst disk 100, seals the stack 15. The low pressure face 106 contacts the alignment adapter 98.

The loader 108 or pilot 108 corresponds to the loader 40. The loader 108, and specifically the face 110 thereof, contacts the seal 102. The face 110, thereby loads the seal 102 and burst disk 100. Note that the loader 108 serves as a pilot 108 in the fitting within the curb 92 of the body 82. Accordingly, tapering, chamfering, or otherwise relieving the pilot 108 may permit easier alignment within the curb 92 of the body 82.

The shoulder 112 may be offset, from the face 110 for several reasons. Stress matching of the loader 108 with the anvil 90 may be important. Likewise, the shoulder 112 must be engaged by the head 118 to be secured thereby. Nevertheless, the shoulder 112 must provided sliding contact between a face 113 and the head 118 during assembly. Slippage between the face 113 and the head 118 permits registration of the head 82 and the loader 108.

A registration notch, key, mark, or the like may be provided for securing a preferred alignment between the conduit 86 and conduit 88, or between the anvil 90 and loader 108. For example, modest tolerances on colinearity between the body 82 and head 84 may be accommodated by measuring or manufacturing the anvil 90 and face 110 of the loader 108 to be oriented in a registered, relative position. Thus, load tolerances may be improved by registration.

In general, the Aperture 114 of the head 84 receives the conduit 88. The face 115 (see FIG. 4) slides circumferentially 68 while loading axially 70 the face 113 of the shoulder 112. Thus, engagement, by the threads 87, of the threads 85 will apply axial 70 loading to the face 113 by the face 115, urging the loader face 110 toward the anvil 90, with the stack 15 captured therebetween.

A retainer 16 may be used in the cavity 91 about the stack 15 of FIGS. 3–4. Nevertheless, a detent 50 may be provided in the curb wall 94 to ease assembly of the seal 102, burst disk 100, and alignment adapter 98. Capture by a detent 50 may ease assembly when the loader 108 is within the curb 92 and is not visible. Moreover, after contact between the threads 85, 87, the head 84 obscures any view of the stack 15 within the cavity 91.

A grip 118 may be provided in certain circumstances. Ease of assembly and maintenance is a desirable feature. A grip 118, such as knurling, and similar treatments may provide ready assembly by hand. Alternatively, and particularly for larger assemblies 10,80, the grip 118 may be adapted to a wrench such as by provision of flats 48 or a hexagonal head, or the like.

Figure 5A:
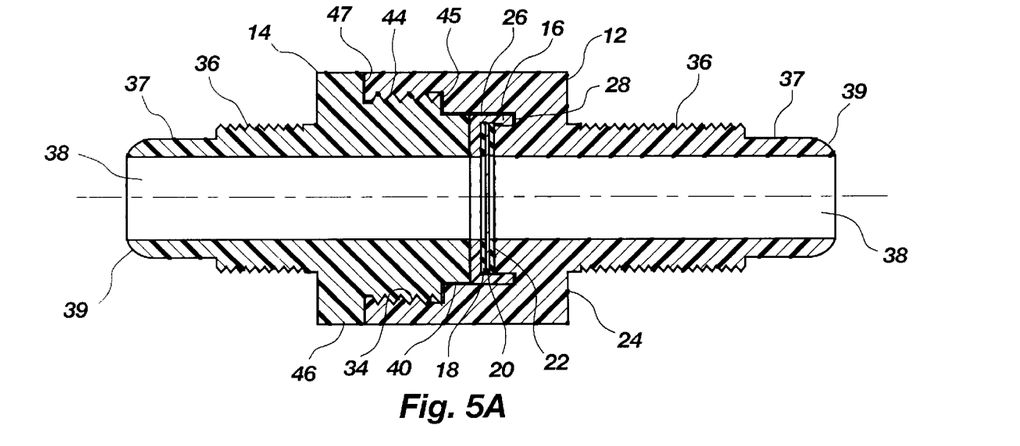
FIG. 5 is a sectioned, side, elevation view of the embodiments of FIGS. 1–4, compared with one another and an alternative embodiment in accordance with the invention.
Figure 5B:
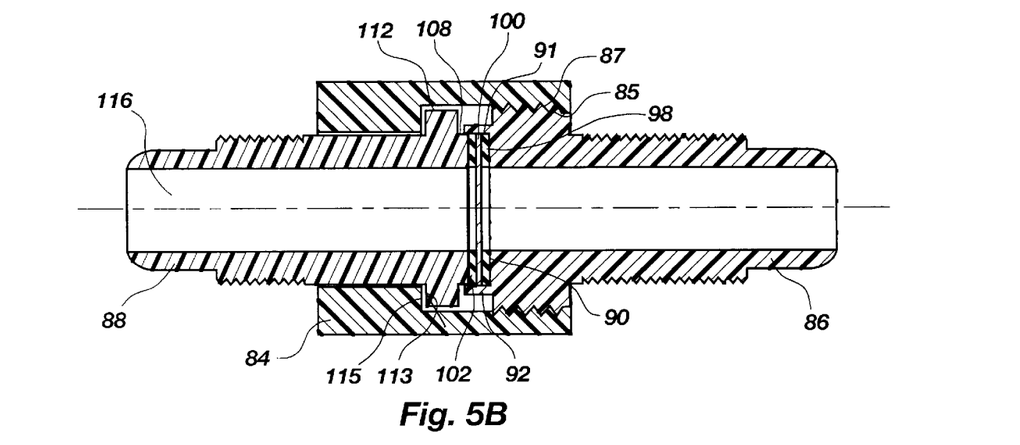
Figure 5C:
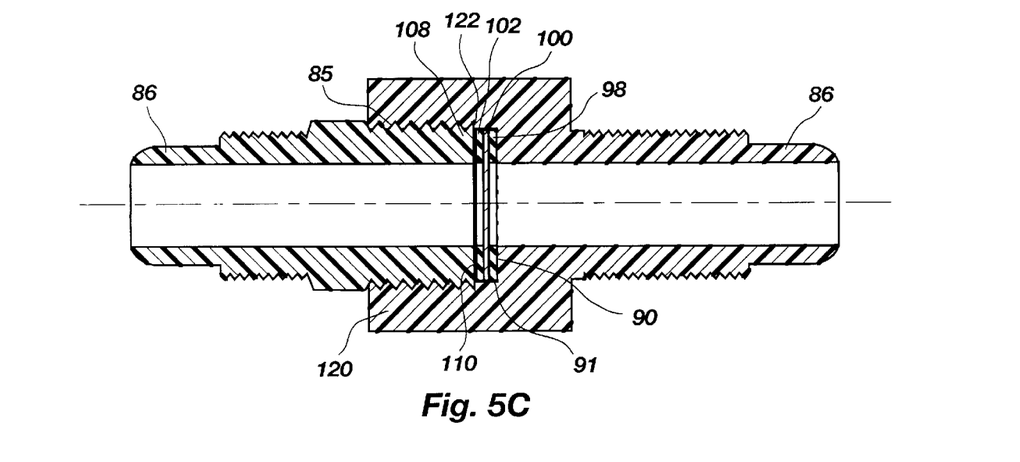

Referring to FIGS. 5A, 5B, and 5C, a comparison may be made between certain embodiments of the apparatus 10. FIG. 5A illustrates the embodiment of FIGS. 1–2. FIG. 5B illustrates the embodiment of FIGS. 3–4. FIG. 5C illustrates an alternative embodiment adapting more conventional plumbing fittings.

In the embodiment of FIG. 5A, the retainer 16 provides for pre-assembly of the stack 15 before insertion into the body 12. Note that the numbering of the FIGS. 5A–5C is coordinated with the numbering scheme of numbers 1–2 in order to promote comparison. Thus, the retainer 16 may be piloted into the chamber 26 readily, to surround the anvil 30, properly positioning thereon the stack 15. By contrast, the stack 15 of FIG. 5B may be assembled within the body 12, with or without the use of detents to assure stability of the stack within the body during threading of the head 14 thereon.

Assembly of the stack 15 in the apparatus 10 of FIG. 5C can be problematic in the orientation illustrated. Without the use of a detent 50, assurance of proper positioning and sealing of the stack between the head and body may be difficult.

Moreover, registration is permitted by the apparatus of FIG. 5B, but not by the apparatus of FIG. 5C. Control of the loading between the loader 40 and anvil 30 is not readily available in the apparatus of FIG. 5C, as compared with the union arrangement of FIG. 5B, or the pre-assembly procedures described above for the apparatus of FIGS. 1,2, 5A.

Figure 6:
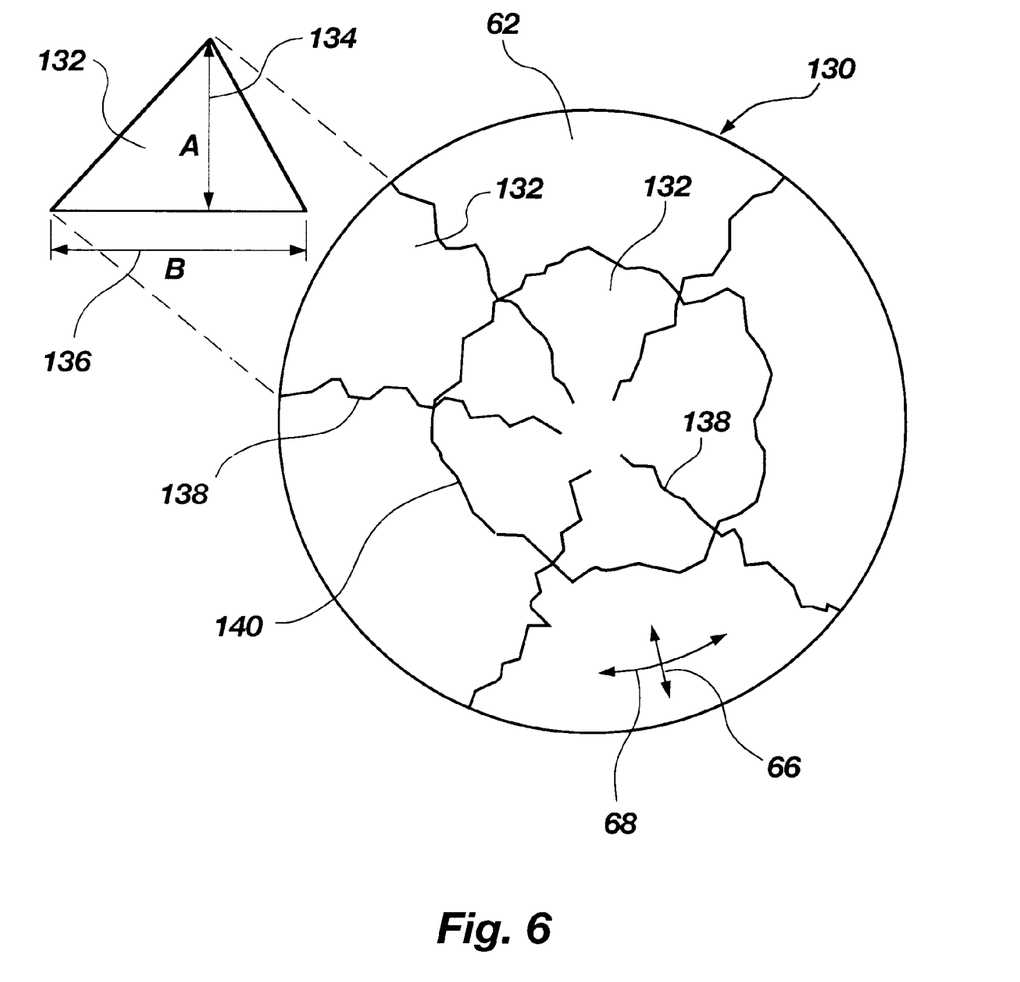
FIG. 6 is an end elevation view of a burst disk, illustrating the observed modes of failure during operation.

Referring to FIG. 6, the burst disk 130 may correspond to a burst disk 20, 100, or the like. Tests were conducted on various burst disks 130 having suitable dimensions adapted to the operational ranges expected in service. The fracture mechanics of the burst disks 130 illustrated certain common features. For example, each of the burst disks 130 tended to fracture into comparatively large fragments 132. For example, in testing, a large proportion of the total mass of each burst disk 130 was accountable within a limited number of similarly shaped, large fragments 132, with respect to the overall mass of the burst disk 130. Each of the fragments 132 tended to have a more-or-less triangular shape. Accordingly, each of the fragments 132 was characterized as if it were a triangle. Accordingly, each fragment 132 was measured for an altitude 134 and a base 136. The triangles 132 or fragments 132 were thus characterized for comparison.

Each of the burst disks 130 was found to initiate fracture along radial breaks 138. Fracture in a radial direction 66 appeared to correspond to shear stress as a failure mechanism within the burst disk 130.

Circumferential fractures 140 propagated in a circumferential direction 68. The circumferential fractures 140 appeared to relate to bending stress across the plate-like burst disk 130, in response to pressure on the high-pressure face 62. In certain embodiments, design engineers may characterize material, diameters 54, and thicknesses 56 (see FIGS. 1–2) of the burst disks 10, 100, 130, correlated with the maximum burst pressure, operational service, and standard deviation of burst pressures.

Figure 7:
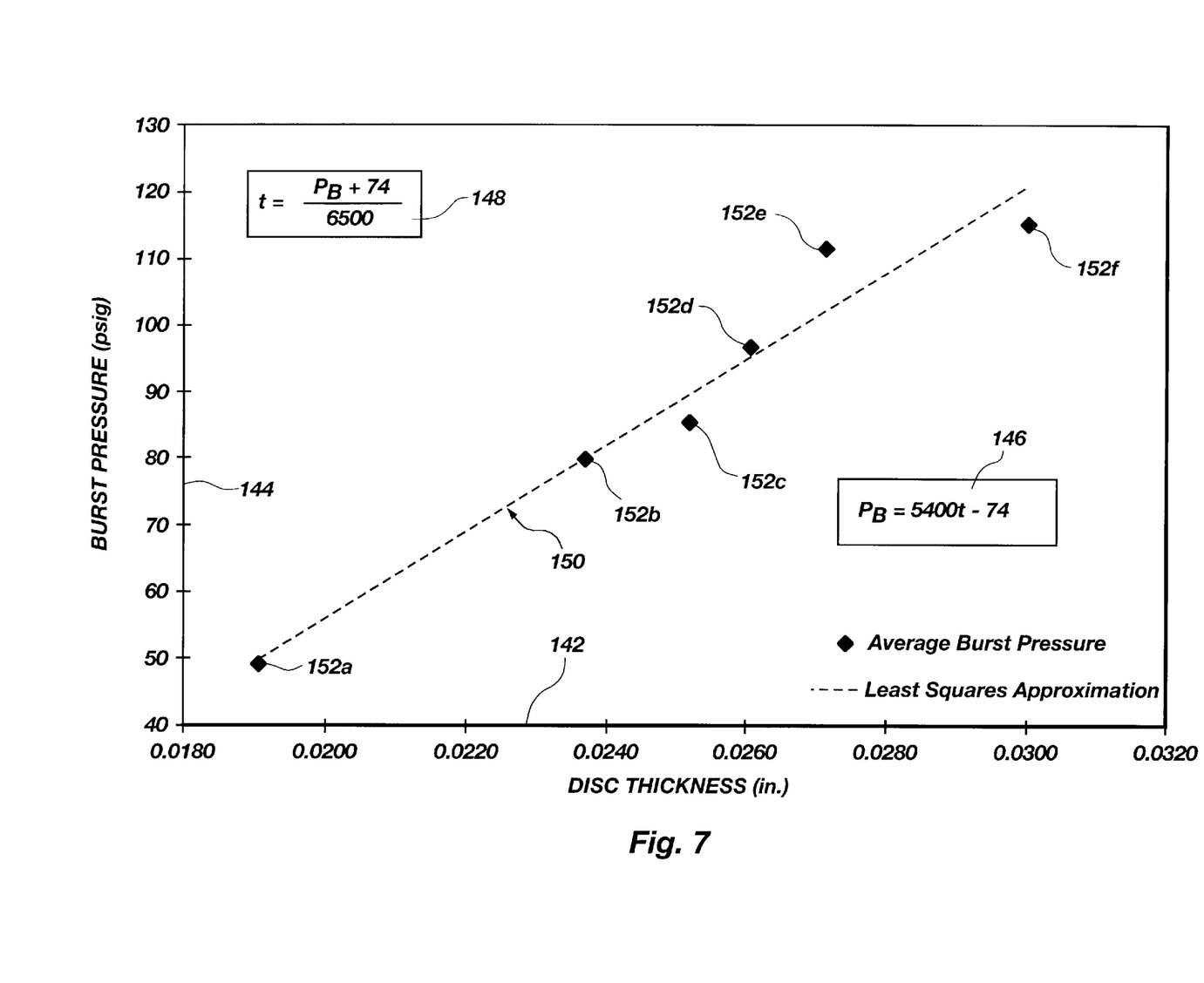
FIG. 7 is a chart of test data for rupture disks, illustrating burst pressure as function of disk thickness.

Referring to FIG. 7, the data for testing of selected burst disks 10, 100, 130 is plotted on an X axis 142 representing a thickness of a burst disk of a size adapted to the proposed apparatus 10, and a Y axis 144 representing the burst pressure of the burst disk 10, 130. The burst pressure fit 146, or equation 146 describing the burst pressure 144, is illustrated. The thickness 148 or the equation 148 describing the thickness 142 in likewise illustrated. Although higher orders of curve fitting may be used, a least squares approximation fit 150 or curve 150 of the points 152a–152f was made.

Figure 8:
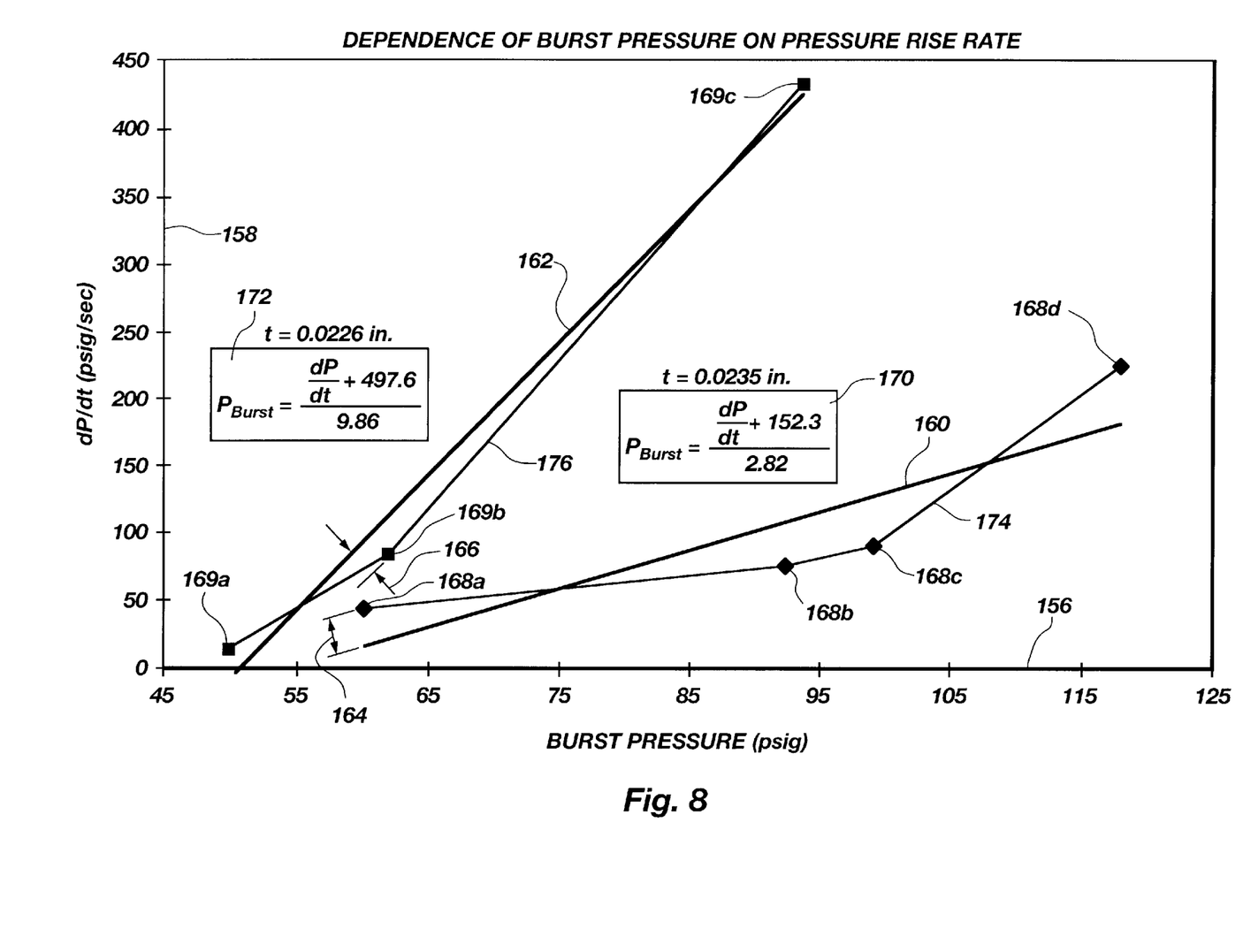
FIG. 8 is a chart of burst pressure dependance on the rate of pressure rise for selected tests of burst disks.

Referring to FIG. 8, a burst pressure 156 or X axis 156 is presented against a rate axis 158 or pressure rise rate 158. The data presented have been plotted to represent a rate 160 or rate equation 160 and a rate 162 for different thickness of burst disks 20, 100, 103.

The rate curves, 160, 162 are illustrated with corresponding, respective maximum deviations 164, 166, for the data taken. Each of the points 168a–168d, 169a, 169c, represents an average rate of rise of burst pressure at a particular gauge pressure applied at failure of a burst disk 20, 100, 103. The relations 170, 172 define each of the curves 160, 162 respectively. The interpolations 174, 176 are only that. Given the nature of variations of testing, a presumption of a higher order curve 160, 162 may or may not be warranted. Accordingly, the curves 160, 162 are simple linear fits. Accordingly, the respective equations 170, 172 represent design pressures at which burst may be expected for the thicknesses (t) used in practice.

From the above discussion, it will be appreciated that the present invention provides a reliable repeatable, producible, reproducible, clean, high-temperature, high-pressure (with respect to ambient), ultra-pure burst disk assembly. A fixture or mounting assembly having a body and head capturing a seal, burst disk, and alignment adapter, provides reliable sealing, with accommodations to the manufacturing variations inherent in commercially available ceramics, crystal, and other brittle materials. The resulting apparatus and performance are superior to metallic and polymeric burst disks. Assembly is reliable at a cost substantially below valve-type systems. Design parameters are available to provide a broad range of pressure, temperatures, and tolerances.

The present invention may be embodied in other specific forms without departing from its structures, methods, or other essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus for providing pressure relief in ultra-pure environments, the apparatus comprising:
    a body formed to provide an anvil having an anvil surface perforated to permit extension of a flow path containing a fluid;
    a head adapted to fasten against the body and formed to provide a loader having a loader surface, perforated to form the flow path, and adapted to apply a load directed toward the anvil surface;
    a nonmetallic burst disk having a burst pressure corresponding thereto and being positioned between the anvil surface and the loader surface, to support a working pressure in the flow path and to burst if the working pressure rises substantially above the burst pressure; and
    a nonmetallic adapter positioned between the anvil and the burst disk, the adapter being formed of a material selected to selectively creep to stable values of stress and secondary creep and for providing repeatable boundary conditions.

2. The apparatus of claim 1, further comprising a seal, being formed of a material selected to creep in response to the load while maintaining sealing.

3. The apparatus of claim 1, wherein the burst disk further comprises a material selected to limit leaching of constituents thereof to a value within the limits of the ultra-pure purity of the fluid after failure of the burst disk.

4. The apparatus of claim 3, wherein the head, seal, and burst disk are formed of materials selected to limit leaching of constituents thereof to a value within the limits of the purity level required for processing semiconductor materials.

5. The apparatus of claim 4, wherein the apparatus is formed of materials selected to resist introducing contaminants, to an extent corresponding to a ratio of less than a part per million of contaminants with respect to the fluid.

6. The apparatus of claim 5, wherein the apparatus is formed of materials selected to resist introducing contaminants, to an extent corresponding to a ratio of less than nominal parts per billion of contaminants with respect to the fluid.

7. The apparatus of claim 1, wherein the burst disk is formed of a crystalline material.

8. A method of protecting against damage by excessive pressure in a fluid, the method comprising:
    providing a fluid containment system comprising a conduit for containing a fluid;
    connecting a head, penetrating into the conduit for communicating the fluid to the head;
    providing a loader face on the head, perforated to communicate fluid therethrough;
    providing a seal fitted against the loader face;
    securing to the seal a nonmetallic burst disk, obstructing the fluid and having a burst pressure corresponding thereto to support a working pressure in the conduit and to burst if the working pressure rises substantially above the burst pressure; and
    providing a nonmetallic adapter positioned between the burst disk and the body, the adapter being formed of a material selected to selectively creep to stable values of stress and secondary creep and for providing repeatable boundary conditions on the burst disk.

9. The method of claim 8, wherein the seal is selected to creep in response to the load while maintaining sealing.

10. The method of claim 9, wherein the burst disk further comprises a material selected to limit leaching of constituents thereof to pre-burst values of the ultra-pure purity of the fluid after failure of the burst disk.

11. The method of claim 8, wherein the burst disk is formed of a crystalline material.

12. The method of claim 8, further comprising selecting for the head, body, seal, and adapter materials selected to limit to pre-failure values the impurities leached therefrom after failure of the burst disk.

13. The method of claim 8, further comprising materials for the head, body, seal, and adapter selected to resist donating contaminants to the fluid, sufficiently effectively to maintain a ratio of contaminants of less than one part per million with respect to the fluid.

14. An apparatus for providing pressure relief in ultra-pure environments comprising:
    a body perforated to permit extension of a flow path containing a fluid;
    a head adapted to fasten against the body, perforated to form the flow path, and adapted to apply a load directed toward the body;
    a burst disk formed of a nonmetallic material and positioned between the body and the head, to support a working pressure in the flow path; and
    an adapter positioned between the body and the burst disk, the adapter being formed of a nonmetallic material selected to selectively creep to sustainable values of stress and secondary creep and for providing repeatable boundary conditions.

15. The apparatus of claim 14, further comprising a seal selected to creep in response to the load while maintaining sealing.

16. The apparatus of claim 15, wherein the body, head, seal, and burst disk are formed of materials selected to limit leaching thereof to values corresponding to a pre-failure purity level of the fluid after failure of the burst disk.

17. The apparatus of claim 15, wherein the apparatus is formed of a material selected to resist donating contaminants to the fluid, sufficiently effectively to maintain a ratio of contaminants of less than one part per million with respect to the fluid.

18. The apparatus of claim 15, wherein the apparatus is formed of a material selected to resist donating contaminants to the fluid, sufficiently effectively to maintain a ratio of contaminants of less than one part per billion with respect to the fluid.

* * * * *